US012737555B2

(12) United States Patent
Agasi et al.

(10) Patent No.: US 12,737,555 B2
(45) Date of Patent: Sep. 15, 2026

(54) SYSTEM AND METHOD FOR LANGUAGE PROCESSING

(71) Applicant: NICE LTD., Ra'anana (IL)

(72) Inventors: Yaniv Agasi, Petah Tikva (IL); Vera Tsvang, Holon (IL); Koren Gershoni, Givatayim (IL); Guy Har Zahav, Ramat Gan (IL); Eliad Vertman, Tel-Aviv (IL); Eliad Gabriel, Gan Yavne (IL)

(73) Assignee: NICE LTD. (IL)

( * ) Notice: Subject to any disclaimer, the term of this patent is extended or adjusted under 35 U.S.C. 154(b) by 339 days.

(21) Appl. No.: 18/421,057

(22) Filed: Jan. 24, 2024

(65) Prior Publication Data

US 2025/0238632 A1 Jul. 24, 2025

(51) Int. Cl.
*G06F 40/40* (2020.01)
*G06F 16/334* (2025.01)
*G06F 40/30* (2020.01)

(52) U.S. Cl.
CPC .......... *G06F 40/40* (2020.01); *G06F 16/3344* (2019.01); *G06F 40/30* (2020.01)

(58) Field of Classification Search
CPC ....... G06F 16/3344; G06F 40/30; G06F 40/40
See application file for complete search history.

(56) References Cited

U.S. PATENT DOCUMENTS 8,769,417 B1 * 7/2014 Robinson ............ G06F 16/9535 715/764
8,983,962 B2 * 3/2015 Nakazawa .......... G06F 16/3329 707/738
2022/0318230 A1 * 10/2022 Sikka ...................... G06F 40/30
2023/0316000 A1 * 10/2023 Mukherjee ........... G06N 3/0475
2025/0124456 A1 * 4/2025 Veerapandian ........ G06Q 10/10

FOREIGN PATENT DOCUMENTS

JP 2023026316 A * 2/2023
WO WO-2019153612 A1 * 8/2019 ........... G06F 40/289

OTHER PUBLICATIONS

J. Ajmera, S. Joshi, A. Verma and A. Mittal, "Automatic generation of question answer pairs from noisy case logs,", 2014, 2014 IEEE 30th International Conference on Data Engineering, Chicago, IL, USA, pp. 436-447 (Year: 2014).*
Google Translation of WO 2019153612 A1, 2019, https://patents.google.com/patent/WO2019153612A1/en?oq=WO+2019153612+A1 (Year: 2019).*
Google Translation of JP 2023026316 A, 2023, https://patents.google.com/patent/JP2023026316A/en?oq=JP+2023026316+A(Year: 2023).*

* cited by examiner

*Primary Examiner* — Eric Yen

(57) ABSTRACT

A system and a method for language processing including a computing device; a memory; and a processor, the processor configured to: identify a question and context for the question in an interaction recording; identify whether the context for the question includes an answer to the question using a machine learning mode, and: when the context for the question includes the answer to the question, generate a question-answer combination and store the combination in a database; and when the context does not include the answer for the question, store the question in the database.

20 Claims, 14 Drawing Sheets

300

IDENTIFYING A QUESTION AND CONTEXT FOR THE QUESTION IN AN INTERACTION RECORDING. 302

IDENTIFYING WHETHER THE CONTEXT FOR THE QUESTION COMPRISES AN ANSWER TO THE QUESTION USING A MACHINE LEARNING MODEL. 304

WHEN THE CONTEXT FOR THE QUESTION INCLUDES THE ANSWER TO THE QUESTION, GENERATING A QUESTION-ANSWER COMBINATION AND STORING THE COMBINATION IN A DATABASE; AND WHEN THE CONTEXT DOES NOT INCLUDE THE ANSWER FOR THE QUESTION, STORING THE QUESTION IN THE DATABASE. 306

Figure 3:
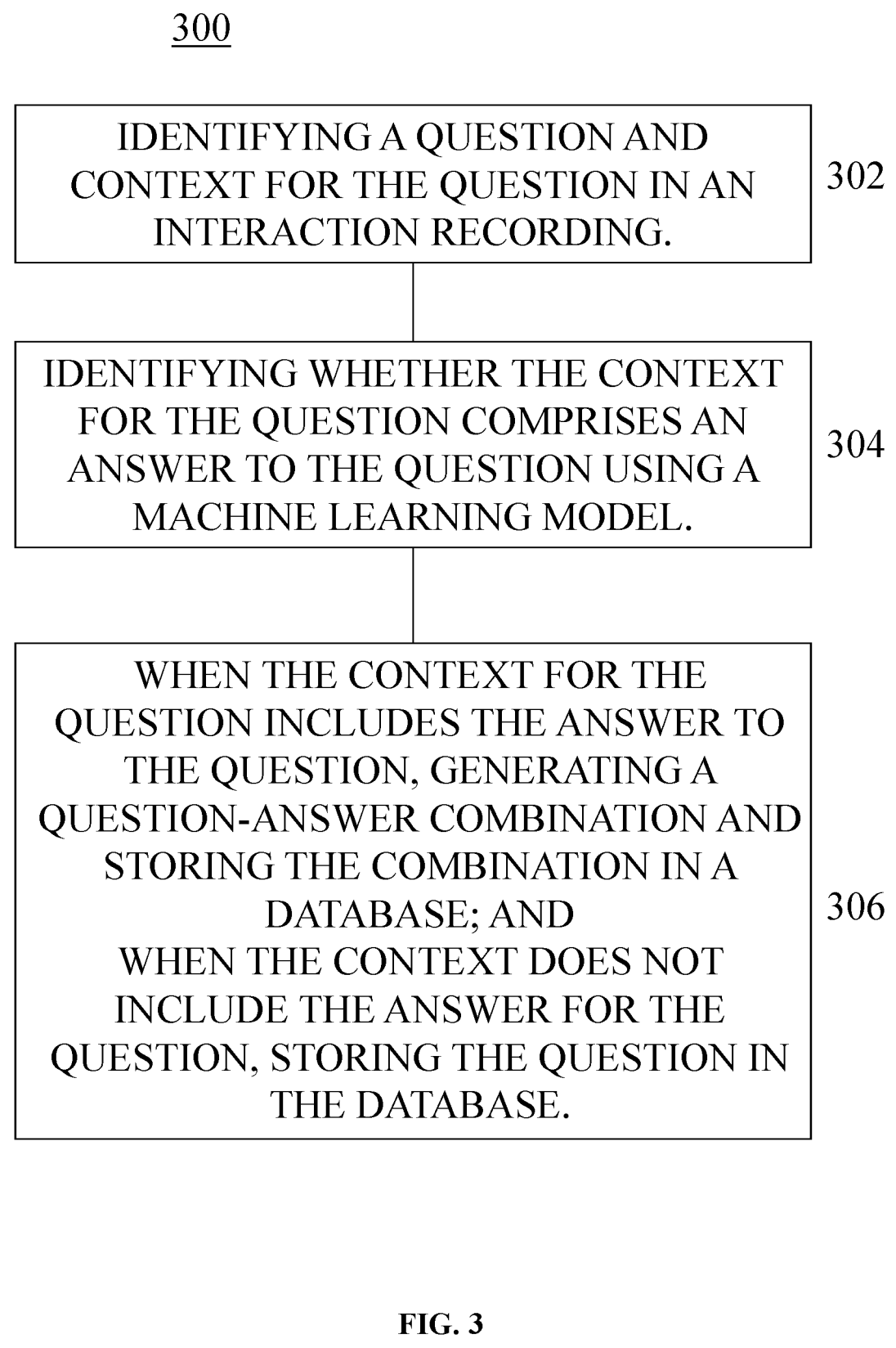

300

IDENTIFYING A QUESTION AND CONTEXT FOR THE QUESTION IN AN INTERACTION RECORDING.

302

IDENTIFYING WHETHER THE CONTEXT FOR THE QUESTION COMPRISES AN ANSWER TO THE QUESTION USING A MACHINE LEARNING MODEL.

304

WHEN THE CONTEXT FOR THE QUESTION INCLUDES THE ANSWER TO THE QUESTION, GENERATING A QUESTION-ANSWER COMBINATION AND STORING THE COMBINATION IN A DATABASE; AND
WHEN THE CONTEXT DOES NOT INCLUDE THE ANSWER FOR THE QUESTION, STORING THE QUESTION IN THE DATABASE.

Frequency Analysis – Questions only

Existing Questions

| | |
|---|---|
| What types of insurance policies are offered by your company? | 56.40% |
| How can I update my policy with my new address? | 39.00% |
| What factors affect my insurance premium? | 4.50% |

FIG. 10A

Frequency Analysis – Questions only

New Questions

| | |
|---|---|
| How can we go on? | 9000 |
| Can’t connect to internet | 7540 |
| How can I add my spouse to my policy? | 400 |

FIG. 10B

Most Frequency Q and A Analysis – Questions only

| Question | % Appearance | In FAQ? | Answers |
| --- | --- | --- | --- |
| How can I update my policy with my new address? | 56.4 | Yes | Answer X 50%<br>Answer Y 14% |
| What types of insurance policies are offered by your company? | 39.0 | Yes | Answer Z 100% |

FIG. 11

SYSTEM AND METHOD FOR LANGUAGE PROCESSING

TECHNICAL FIELD OF THE INVENTION

The present invention relates generally to language processing of interaction recordings, specifically to the formation of language relating to tasks for agents, for example at contact centers, via the analysis of sentence structures of interaction recordings.

BACKGROUND OF THE INVENTION

Client-facing businesses may frequently experience that a large proportion of their customers may seek assistance for specific business-related issues, e.g. by attempting to initiate interactions with agents across various voice and text channels, e.g. via calling a call center.

However, many customer issues are considered as reoccurring issues and can be addressed without requiring a conversation with an agent or an interaction bot. Solutions to some issues may already be documented, for example, in existing frequently asked question (FAQ) pages.

However, services and products provided by contact centers constantly change, and customers' questions may evolve over time, e.g. new questions are likely to arise for new products or services.

Further, providers of FAQ pages may not be aware of questions that frequently arise in customer interactions, e.g. due to data collection limitations. As a result, FAQ pages may lack information that customers require to solve an issue independently or contain incorrect/outdated information leading to customer frustration. Missing or incorrect information in FAQ pages may further lead to an increased workload of contact centers since they may be required to handle requests from customers concerning missing information or remediating incorrect information.

Thus, there is a need for a solution that allows automatically generating useful language for, for example FAQ pages, via language processing of interaction recordings, e.g. interactions between agents and customers.

SUMMARY OF THE INVENTION

Embodiments may improve natural language processing technology by for example automatically processing language, e.g. the extraction of questions present in interaction recordings and the identification and/or generation of answers to the identified questions.

Improvements and advantages of embodiments of the invention may include the use of large language models in the identification of question-answer pairs.

In particular, improvements and advantages of embodiments of the invention may include the automatic recommendation of question-answer pairs based on semantic comparison of question and answer to stored question-answer pairs, e.g. by identifying common questions, reoccurring topics and problems in questions.

One embodiment may include a method of language processing including: identifying a question and context for the question in an interaction recording; identifying whether the context for the question includes an answer to the question using a machine learning model, and: when the context for the question includes the answer to the question, generating a question-answer combination and storing the combination in a database; and when the context does not include the answer for the question, storing the question in the database.

In one embodiment, the question-answer combination are separated from the interaction recording using the machine learning model.

In one embodiment, the machine learning model is a large language model.

One embodiment includes querying a database for a recorded question-answer combination that includes the question-answer combination, and: when the recorded question-answer combination includes the question of the question-answer combination, increasing a counter for the recorded question and assessing whether the answer of the recorded question-answer combination includes the answer of the recorded question-answer combination: when the recorded question-answer combination includes the answer of the question-answer combination, increasing a counter for the recorded answer; and when the recorded question-answer combination does not include the answer of the question-answer combination, adding the answer to the recorded question; and when the recorded question-answer combination does not include the question of the question-answer combination, adding the question-answer combination to the database.

One embodiment includes periodically identifying question-answer combinations which have a counter value that is above a threshold counter value and generating a list of frequently asked questions and answers to the questions-answer combinations.

One embodiment includes using the list of frequently asked questions and answers in the automatic provision of an answer to a received question.

One embodiment includes using the list of frequently asked questions and answers in providing an agent with recommended answers to a customer query.

In one embodiment, a similarity between the question and the question in the recorded question-answer combination is identified by assessing a semantic similarity between the questions.

In one embodiment, the semantic similarity between the questions is assessed by vectorial representation of the question and the recorded question and calculation of a cosine similarity.

One embodiment includes automatically updating recorded question-answer combinations by updating one or more of: a question, an answer to a question, a question-answer combination.

One embodiment may include a system for language processing including: a computing device; a memory; and a processor, the processor configured to: identify a question and context for the question in an interaction recording; identify whether the context for the question includes an answer to the question using a machine learning mode, and: when the context for the question includes the answer to the question, generate a question-answer combination and store the combination in a database; and when the context does not include the answer for the question, store the question in the database.

One embodiment may include language processing of interaction recordings, the method including: identifying a question and context for the question in a recording of an interaction; identifying whether the context for the question includes a response to the question using a machine learning model: when the context for the question includes the response to the question, creating a question-response pair and storing the pair in a database; and when the context does not include the response for the question, storing the question in the database.

These, additional, and/or other aspects and/or advantages of the present invention may be set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 depicts a flowchart of methods of language processing, according to some embodiments of the present invention.

FIG. 10A depicts an example of a user interface for a frequency analysis of questions, according to some embodiments of the present invention.

FIG. 10B depicts an example of a user interface for a frequency analysis of questions, according to some embodiments of the present invention.

FIG. 11 depicts an example of a user interface for a frequency analysis of questions-answer combinations, according to some embodiments of the present invention.

Figure 1:
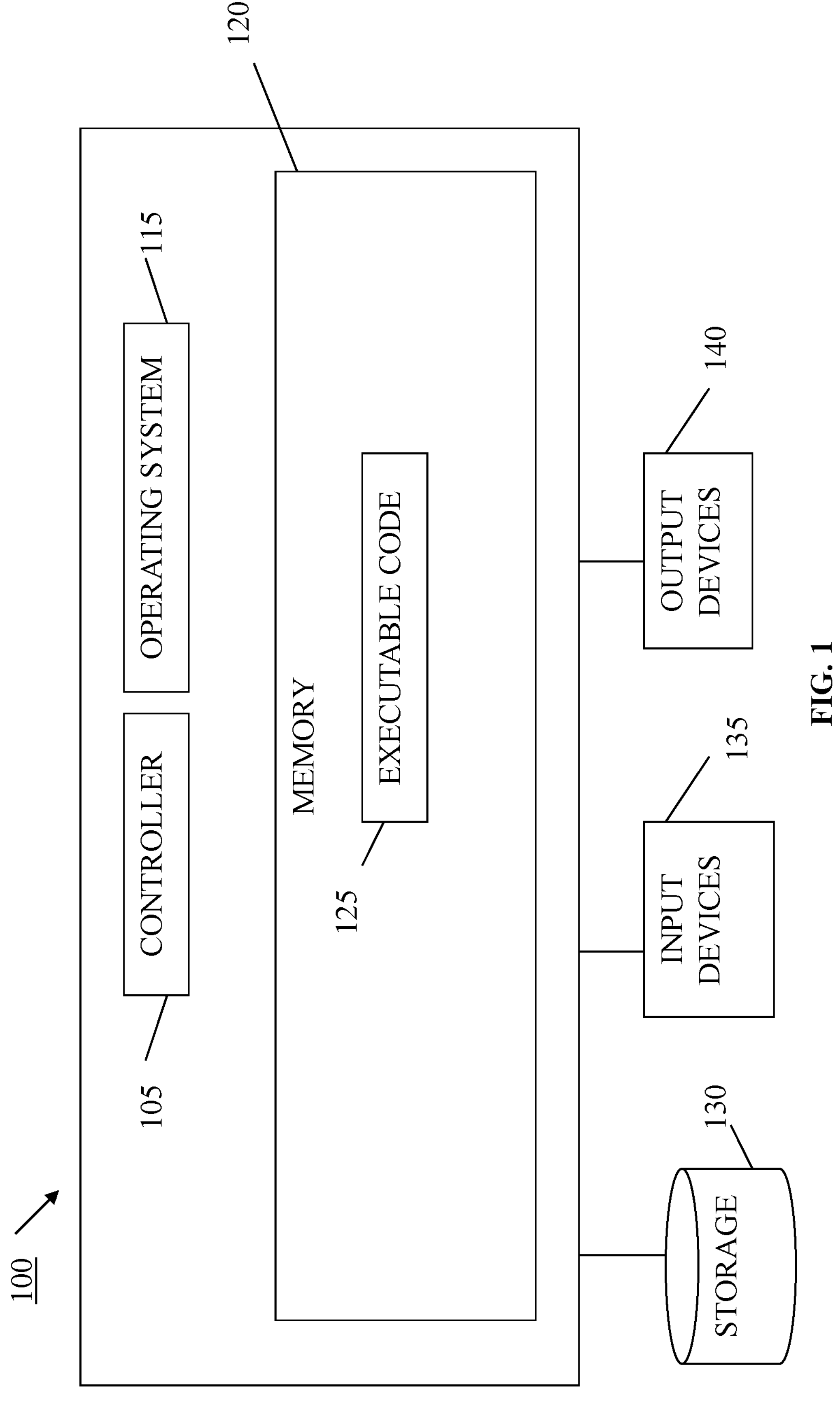
FIG. 1 shows a block diagram of an exemplary computing device which may be used with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as “processing”, “computing”, “calculating”, “determining”, “enhancing” or the like, refer to the action and/or processes of a computer or computing system, or similar electronic computing device, that manipulates and/or transforms data represented as physical, such as electronic, quantities within the computing system’s registers and/or memories into other data similarly represented as physical quantities within the computing system’s memories, registers or other such information storage, transmission or display devices. Any of the disclosed modules or units may be at least partially implemented by a computer processor.

As used herein, “contact center” may refer to a centralized office used for receiving or transmitting a large volume of enquiries, communications, or interactions. The enquiries, communications, or interactions may utilize telephone calls, emails, message chats, SMS (short message service) messages, etc. A contact center may, for example, be operated by a company to administer incoming product or service support or information enquiries from customers/consumers. The company may be a contact-center-as-a-service (CCaaS) company.

As used herein, “call center” may refer to a contact center that primarily handles telephone calls rather than other types of enquiries, communications, or interactions. Any reference to a contact center herein should be taken to be applicable to a call center, and vice versa.

As used herein, “interaction” may refer to a communication between two or more people (e.g., in the context of a contact center, an agent and a customer), typically via devices such as computers, customer devices, agent devices, etc., and may include, for example, voice telephone calls, conference calls, video recordings, face-to-face interactions (e.g., as recorded by a microphone or video camera), emails, web chats, SMS messages, etc. An interaction may be recorded to generate an "interaction recording". An interaction recording may also refer to the data which is transferred and stored in a computer system recording the interaction, the data representing the interaction, including for example voice or video recordings, data items describing the interaction or the parties, a text-based transcript of the interaction, etc. Interactions as described herein may be "computer-based interactions", e.g., one or more voice telephone calls, conference calls, video recordings/streams of an interaction, face-to-face interactions (or recordings thereof), emails, web chats, SMS messages, etc. Interactions may be computer-based if, for example, the interaction has associated data or metadata items stored or processed on a computer, the interaction is tracked or facilitated by a server, the interaction is recorded on a computer, data is extracted from the interaction, etc. Some computer-based interactions may take place via the internet, such as some emails and web chats, whereas some computer-based interactions may take place via other networks, such as some telephone calls and SMS messages. An interaction may take place using text data, e.g., email, web chat, SMS, etc., or an interaction may not be text-based, e.g., voice telephone calls. Non-text-based interactions may be converted into text-based interaction recordings (e.g., using automatic speech recognition). Interaction data and Interaction recordings may be produced, transferred, received, etc., asynchronously.

As used herein, "agent" may refer to a contact center employee that answers incoming interactions, and may, for example, handle customer requests.

A "question" may be linguistic expression or statement that can be used to elicit information, express inquiry or prompt a response. Questions may be used in communication, e.g. in interactions such as chats, phone calls etc. Questions can be yes/no questions, open-ended questions and may begin with indicative question words such as "what", "how", "why", or "when". A structure of a question may be dependent on context and information the questioner is seeking.

An "answer" may be a response to a question, problem or inquiry. It may provide information or clarification in reply to a specific query or statement.

A "context" may refer to circumstances or settings in which something occurs or exists. It may provide the background or framework that helps to clarify the meaning, e.g. of a question. Context may help interpreting information, e.g. a question accurately, as an answer to a question may be dependent or influenced by surrounding circumstances.

A "question answer combination" may be a pair including a question and an answer that may have been identified from context of a question. In a question-combination, an answer may correspond to a question meaning that a question may be used to extract information and an answer may be an extracted information that is asked for in a question.

A "tuple" may be a combination or pair of a question and context to the question or a combination or pair of question and answer to the question.

As used herein, "machine learning", "machine learning algorithms", "machine learning models", "ML", or similar, may refer to models built by algorithms in response to/based on input sample or training data. ML models may make predictions or decisions without being explicitly programmed to do so. ML models require training/learning based on the input data, which may take various forms. In a supervised ML approach, input sample data may include data which is labeled, for example, in the present application, the input sample data may include a transcript of an interaction and a label indicating whether or not the interaction was satisfactory. In an unsupervised ML approach, the input sample data may not include any labels, for example, in the present application, the input sample data may include interaction transcripts only.

ML models may, for example, include (artificial) neural networks (NN), decision trees, regression analysis, Bayesian networks, Gaussian networks, genetic processes, etc. Additionally or alternatively, ensemble learning methods may be used which may use multiple/modified learning algorithms, for example, to enhance performance. Ensemble methods, may, for example, include "Random forest" methods or "XGBoost" methods.

Neural networks (NN) (or connectionist systems) are computing systems inspired by biological computing systems, but operating using manufactured digital computing technology. NNs are made up of computing units typically called neurons (which are artificial neurons or nodes, as opposed to biological neurons) communicating with each other via connections, links or edges. In common NN implementations, the signal at the link between artificial neurons or nodes can be for example a real number, and the output of each neuron or node can be computed by function of the (typically weighted) sum of its inputs, such as a rectified linear unit (ReLU) function. NN links or edges typically have a weight that adjusts as learning proceeds. The weight increases or decreases the strength of the signal at a connection. Typically, NN neurons or nodes are divided or arranged into layers, where different layers can perform different kinds of transformations on their inputs and can have different patterns of connections with other layers. NN systems can learn to perform tasks by considering example input data, generally without being programmed with any task-specific rules, being presented with the correct output for the data, and self-correcting, or learning.

Various types of NNs exist. For example, a convolutional neural network (CNN) can be a deep, feed-forward network, which includes one or more convolutional layers, fully connected layers, and/or pooling layers. CNNs are particularly useful for visual applications. Other NNs can include for example transformer NNs, useful for speech or natural language applications, and long short-term memory (LSTM) networks.

In practice, a NN, or NN learning, can be simulated by one or more computing nodes or cores, such as generic central processing units (CPUs, e.g., as embodied in personal computers) or graphics processing units (GPUs such as provided by Nvidia Corporation), which can be connected by a data network. A NN can be modelled as an abstract mathematical object and translated physically to CPU or GPU as for example a sequence of matrix operations where entries in the matrix represent neurons (e.g., artificial neurons connected by edges or links) and matrix functions represent functions of the NN.

Typical NNs can require that nodes of one layer depend on the output of a previous layer as their inputs. Current systems typically proceed in a synchronous manner, first typically executing all (or substantially all) of the outputs of a prior layer to feed the outputs as inputs to the next layer. Each layer can be executed on a set of cores synchronously (or substantially synchronously), which can require a large amount of computational power, on the order of 10s or even 100s of Teraflops, or a large set of cores. On modern GPUs this can be done using 4,000-5,000 cores.

It will be understood that any subsequent reference to "machine learning", "machine learning algorithms", "machine learning models", "ML", or similar, may refer to any/all of the above ML examples, as well as any other ML models and methods as may be considered appropriate.

FIG. 1 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of modules and equipment and other devices and modules discussed herein, e.g. computing device 202, agent device 210, customer device 220, digital detection module, recommendation module, and modules in FIGS. 2, 4, 5, 12 and 13 may be or include, or may be executed by, a computing device such as included in FIG. 1 although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIG. 3 according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by, for example, executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 2:
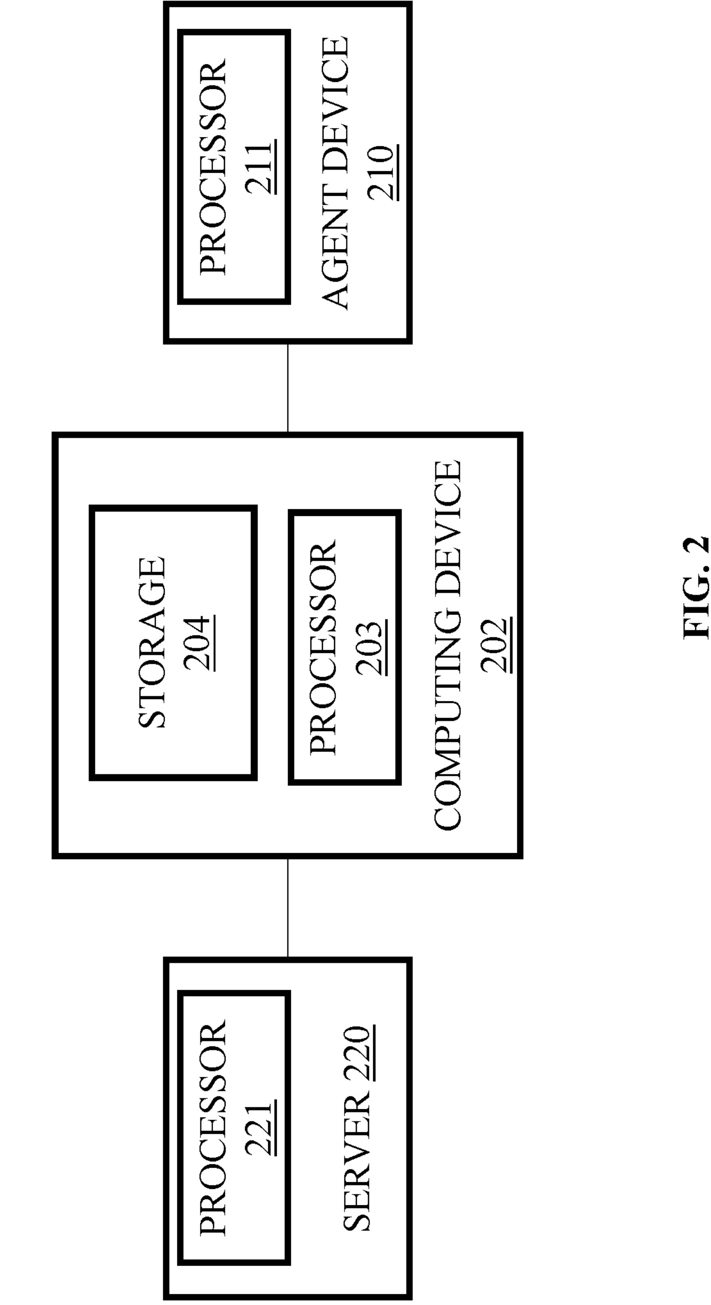
FIG. 2 is a schematic drawing of a system for language processing, according to some embodiments of the invention.

FIG. 2 is a schematic drawing of a system 200 according to some embodiments of the invention. System 200 may include a computing device 202 including a processor 203 and storage 204. Computing agent device 202 may be connected to an agent device 210 that includes processor 211. Computing device 202 may be connected to a server 220 including processor 221. Server 220 and Agent device 210 may provide computing device 202 with interaction recordings. Alternatively, interaction recordings may be stored in storage 204 of computing device 202.

Computing devices 100, 202, 210 and 220 may be servers, personal computers, desktop computers, mobile computers, laptop computers, and notebook computers or any other suitable device such as a cellular telephone, personal digital assistant (PDA), video game console, etc., and may include wired or wireless connections or modems. Computing devices 100, 202, 210 and 220 may include one or more input devices, for receiving input from a user (e.g., via a pointing device, click-wheel or mouse, keys, touch screen, recorder/microphone, or other input components). Computers 100, 202, 210 and 220 may include one or more output devices (e.g., a monitor, screen, or speaker) for displaying or conveying data to a user.

Any computing devices of FIGS. 1 and 2 (e.g., 100, 202, 210 and 220), or their constituent parts, may be configured to carry out any of the methods of the present invention. Any computing devices of FIGS. 1 and 2, or their constituent parts, may include a QA extractor 408, a QA refiner 410 or an insights provider module 420, or another engine or module, which may be configured to perform some or all of the methods of the present invention. The systems and methods of the present invention may be incorporated into or form part of a larger platform or a system/ecosystem, such as agent management platforms. The platform, system, or ecosystem may be run using the computing devices of FIGS. 1 and 2, or their constituent parts. A processor such as processor 203 of computing device 202 processor 211 of device 210, and/or processor 221 of computing device 220 may be configured to identify a question and context for the question in an interaction recording. For example, a processor such as processor 203, 211 and/or 221 may be configured to identify a question in an interaction (e.g. in a transcript of an interaction) such as "How can I restart a router?" and context for the question may be "A router has a green, a red and a blue button. To restart a router, press the blue button". A processor such as processor 203 of computing device 202 processor 211 of device 210, and/or processor 221 of computing device 220 may be configured to identify whether or not the context for the question includes an answer to the question using a machine learning mode. For example, a processor such as processor 203 may be configured to identify whether the context for the question includes an answer to the question using a large language model (LLM), or does not, and can separate a question-answer combination from superfluous parts of an interaction recordings, e.g. greetings. A processor such as processor 203 of computing device 202 processor 211 of device 210, and/or processor 221 of computing device 220 may be configured to generate a question-answer combination and store the combination in a database, if or when the context for the question includes the answer to the question. For example, context may include an answer to a question if or when a requested information item or part of a requested information item present in a question is provided in a context, e.g. the answer is derivable from sentences that preceded or superseded a question. A processor such as processor 203 of computing device 202 processor 211 of device 210, and/or processor 221 of computing device 220 may be configured to store the question in the database, if or when the context does not include the answer for the question.

FIG. 3 shows a flowchart of a method 300 of generating text or language such as a list of tasks from an interaction recording, e.g. an interaction recording which may have been received by computing device 202. The system displayed in FIG. 2 and the method shown in FIG. 3 may refer to the generation of a list of tasks from an interaction recording which have been received from an agent device, e.g. 210, or a database, e.g. server 220, however, the system and the method may also be used to generate a list of tasks from an interaction recording when executed on a server or agent device. According to some embodiments, some or all of the steps of the method are performed (fully or partially) by one or more of the computational components, for example, those shown in FIGS. 1 and 2.

Method 300 for language processing may be executed by a processor of computing device 202, such as processor 203. For example, method 300 may allow processing interactions or interaction recordings, e.g. between agents and customers of a contact center. For example, a system may interpret natural language using semantics, e.g. by extracting meanings of words, phrases and sentences. In another example, a system may interpret natural language using syntax analysis, e.g. by understanding grammatical structure and relationships between words, e.g. a word order in a question and/or a word order used in the provision of an answer to a question.

In operation 302, a question and context for the question may be identified in an interaction recording, e.g. in a transcript, or in an audio or video recording.

Question and context for the question may be identified, e.g. by an application using natural language understanding. For example, sentences within an interaction may be analyzed for questions or context to a question using syntax analysis or semantics within interactions. The identification of questions and context to questions may include the identification of key words such as "when", "how", "what".

In operation 304, it may be identified whether or not the context for the question includes an answer to the question using a machine learning model.

For example, an answer for a question may be identified from context for a question by submitting a prompt to a machine learning model, e.g. a LLM, that includes a request for an LLM to identify an answer for an identified question within context for the identified question. In case that no answer can be identified for a question, the LLM model may be requested to respond with the term "No answer". For example, part of a prompt to identify an answer for an identified question may read: "Given the question and the short paragraph, return a concise answer to the question if exists, else return "No answer"". No answer may be detected within context, e.g. in case that a customer asks multiple questions and the answer may not appear in that limited context, an agent could not respond to the question with an answer, e.g. they replied with "I need to check with . . . ".

In operation 306, if or when the context for the question includes the answer to the question, a question-answer combination is generated and the combination is stored in a database; and if or when the context does not include the answer for the question, the question is stored in the database. For example, in case that context to a question includes an answer to the question, a question-answer combination, e.g. a tuple including a question and an answer to the question extracted from an interaction recording, e.g. a transcription, may be stored in a database. For example, in case that context to a question does not include an answer to the question, a question is not linked to an answer, e.g. the question is not part of a question answer combination, and only the question may be stored in a database.

Figure 4:
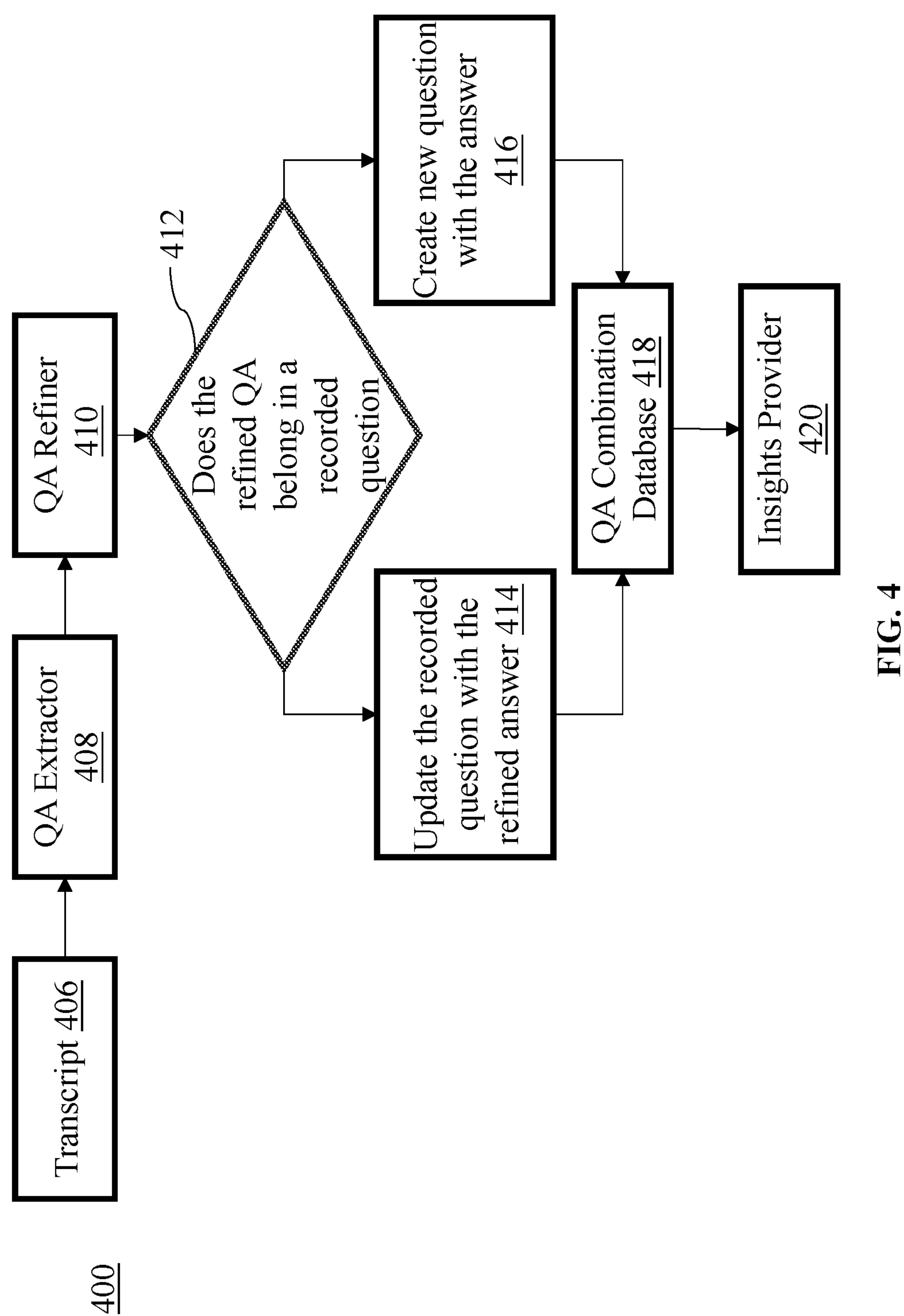
FIG. 4 illustrates steps in the identification of a question and context for the question in an interaction recording, according to some embodiments of the present invention.

FIG. 4 shows a high-level block diagram 400 illustrating the identification of a question and context for a question present in an interaction recording. An interaction recording, e.g. a transcript 406 of an interaction such as a transcript of a text chat or phone call, may be received at the QA extractor 408. A transcript 406 may include interactions of an agent and interactions of a customer. A QA extractor 408 may be a service that allows identifying a question and context for a question in an interaction recording. In some embodiments, an interaction may include at least one question and at least one answer. Context for a question may be part of a transcript that may be received prior to the recording of a question or after a recording of a question. For example, context may include a few sentences that are likely to have an answer to the question asked, because they appear, in the transcript, right after it. Output of QA extractor 408 may be a question-context combination. A "few sentences" may be a number of turns in an interaction between an agent and a customer, e.g. one, two or more messages or replies that follow after or precede an identified question.

A question-context combination may be separated from an interaction recording using a machine learning model, e.g. a large language model (LLM).

A machine learning model, e.g. an LLM may allow refining a question by removing details from a question that do not form part of the essence of a question. For example, in case that a question included the phrase "Hey John, thank you for contacting me, I would like to know how I can reset the router?", an LLM may remove phrases in sentences such as greetings, set phrases and courtesy remarks (e.g. "hello", "good bye", "thank you", "please" etc.). Accordingly, an output for the phrase may be "how I can reset the router?", refining the question may allow separating irrelevant details from a question and maintain a question in a concise form.

A machine learning model, e.g. an LLM provided by Open AI may allow refining context by removing details from context that does not form part of the essence of a context to a question. For example, using machine learning model, e.g. an LLM may identify whether or not context of a question includes an answer to a question. For example, in case that a question included the phrase "Hey John, thank you for contacting me, I would like to know how I can reset the router?", an LLM may remove greetings, set phrases and courtesy remarks. In the case that that context of a question is not identified as including an answer to a question, no action is taken, e.g. by a machine learning model, or an answer "No answer" may be generated. Accordingly, an output for the phrase may be "how I can reset the router?" Separating (herein also referred to as refining) a question from sentences or parts of a sentence which do not form part of the core intention of a question for which an answer is desired may allow maintaining a question in a concise form.

Additionally, using an LLM, an answer may be extracted and refined from context in a similar fashion. In the identification of an answer for a question, a question and context for the question may be included in a prompt that is processed by an LLM. For example, an excerpt of an example prompt for an extraction of an answer from context for a question may read:

Question: the question

Context: the context (instruction) Check if the context contains an answer to the question, if so, return a concise version of the answer, otherwise, return "No answer"

For example, an excerpt of an example prompt for a refinement of a question and/or an answer may read:

Question/Answer: The question/answer (instruction) make the question/answer more concise by removing unnecessary parts for a FAQ page question/answer In another example, a question "Hi, I don't know how to connect to my account, can you help?" may be refined to read "how to connect to the account". Phrases such as "I don't know" and "can you help me" have been removed in the refinement and the question has been minorly reworded by substituting "my account" with "the account".

A QA refiner 410 may be a service that may allow identifying whether or not a refined question-answer (QA) combination belongs to a recorded question (412). A question-answer combination belongs to a recorded question, e.g. if a semantic similarity can be identified between a recorded question and an identified question of a question answer combination. In case that context does not include an answer for a question, the question, without an answer, may be stored in a database, e.g. a QA combination database 418.

A QA combination database may provide question-answer combinations or questions without an answer to an analytics software, e.g. insights provider 420.

For each generated question-answer combination, insights provider 420 may query, for example, a database such as QA combination database 418, to identify whether or not a question is already present in a stored question of a recorded question-answer combination.

If or when a recorded question-answer combination includes a question of a question-answer combination (414), insights provider 420 may increase a counter for the recorded question and may assess whether or not an answer for a recorded question-answer combination includes an answer for a recorded question-answer combination.

If or when a recorded question-answer combination includes an answer of a question-answer combination, a counter for a recorded answer may be increased, e.g. by a value of "1". A value or counter value may be initialized, e.g. at a value of "O".

For example, if or when a recorded question-answer combination may already include a question "How can I contact customer service?" and a question-answer combination includes a question "How can we engage with customer service", the recorded question-answer combination includes the question-answer combination and in case that the question was present in three previous interactions, a counter may be increased from "3" to "4".

If or when a recorded question-answer combination does not include an answer of the question-answer combination, e.g. because the answer is a new answer to the question, an answer may be added for a recorded question (416).

If or when a recorded question-answer combination does not include the question of the question-answer combination, a question-answer combination may be added to a recorded question-answer combinations present in a database, e.g. database 418.

Insights provider 420 may periodically identify, e.g. automatically or manually on request by an agent or a customer, whether or not question-answer combinations have a counter value that is above a threshold counter value and may generate a list of frequently asked questions and answers to the questions-answer combinations. A periodical identification of threshold values and counter values for question answer combinations, e.g. whether or not question-answer combinations have a counter value that is above a threshold counter value, may be assessed repeatedly, e.g. once a day, once a week, once a month or e.g. when an agent requests identifying question-answer combinations with a set threshold value.

Frequently asked questions and answers may be identified by determining a ratio of an occurrence of a question and/or answer among all recorded question answer-combinations, e.g. by comparing a value of a counter for a question and/or answer within the value of counter values for all recorded question answer-combinations. For example, question A may have a counter value of "10" and each of the remaining four questions (B-E) has a counter value of "5". The ratio of the occurrence of a question A among all recorded question may be 10/30=33%. The ratio may lie over a percentage threshold, e.g. 30%, and question A may be considered a frequently asked question.

In case that one or more answers have been identified for a question, insights provider 420 may identify whether or not an answer is a frequently provided answer for a question by determining a ratio of the occurrence of an answer among all recorded answers for a question by comparing a value of a counter for an answer within a sum of counter values for all recorded answers for a particular question. In case that no answers have been identified for a question, no action may be taken by insights provider 420. For example, for question A answers B, C and D may have been identified with counter values 30, 50 and 100, a ratio of the occurrence of an answer among all recorded answers may be calculated for each answer B, C and D: for B: 20/180=11%, for C: 50/180=28% and for D: 100/180=56%. In case of a percentage threshold of 30%, answer D may have a percentage threshold that is higher than 30% and the answer may be considered a frequently provided answer to question A. Answers B and C may have a percentage threshold that is lower than 30% and answers B and C cannot be considered frequently provided answers to question A.

Software, e.g. an insights provider 420, may generate a list of frequently asked questions and answers to the questions-answer combinations. A list of frequently asked questions can be used automatically, e.g. when a customer sends a question to insights provider 420, an insights provider may automatically respond to the question by providing an answer to the question that is a frequently provided answer to the question.

A list of frequently asked questions and answers can also be provided to an agent dealing with a customer query. For example, in a customer agent interaction, agent A may receive a question from customer B. Insights provider 420 may identify a question in an interaction and may query a database, e.g. question groups database 418 for the question. In case that a question was previously recorded, insights provider 420 may identify whether or not the question is linked to question-answer combinations and provide a customer, e.g. customer using a computing device such as computing device 100, with a list of question-answer combinations. Insights provider 420 may provide a customer with answers to a question that have frequently been provided to customers, e.g. answers that lie above a threshold value such as 30% of all provided answers. Advantageously, a client may use a pre-identified answer to a question when responding to a customer query than reviewing all recorded answers for a question and can provide a customer with an answer in a shorter period of time. Customers and agents may use insights provider 420 via a user interface as depicted, for example, in FIG. 10A, 10B or 11.

Figure 5:
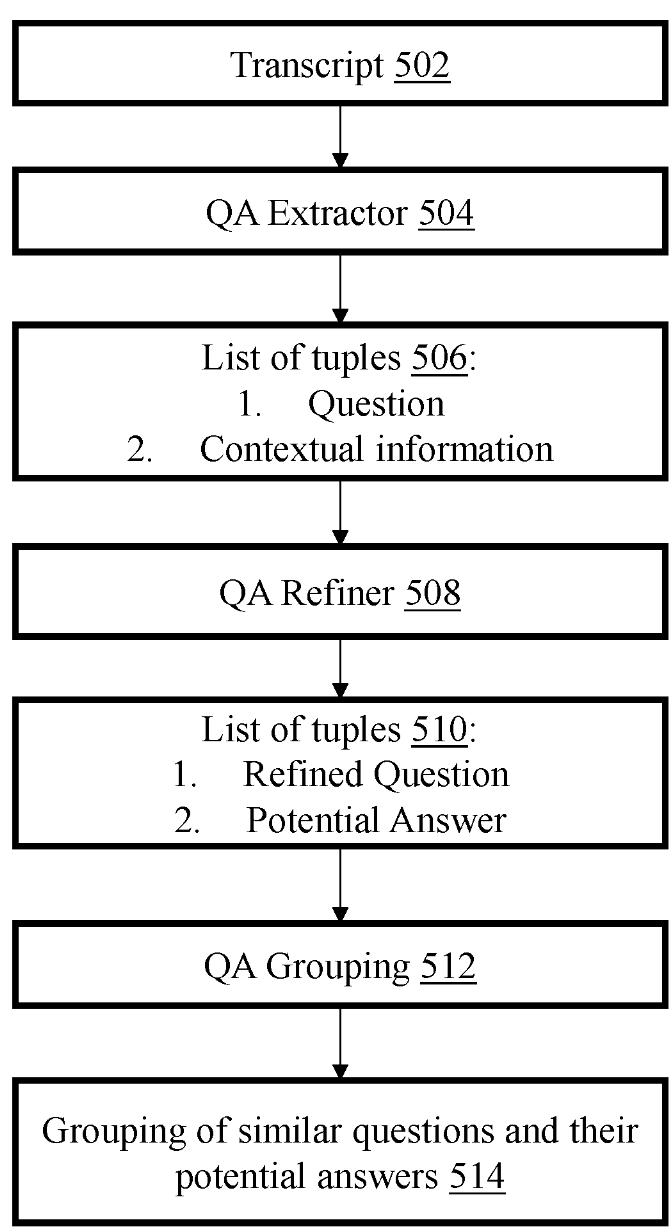
FIG. 5 illustrates steps in the identification of a question and context for the question in an interaction recording, according to some embodiments of the present invention.

FIG. 5 shows a flow chart 500 that illustrates the identification of a question and context for the question in an interaction recording using a QA extractor. An interaction recording, e.g. a transcript of an interaction 502, may be submitted to a QA (Question-Answer) extractor 504. A QA instructor may be a service that extracts questions and contextual information to the questions from an interaction recording. For example, an extraction of a question and contextual information for the question may proceed using TextTools, dialogue act classifier or intent classifier. TextTools is software developed by NICE Ltd. that may allow extracting sentences that have been classified as important in an interaction, e.g. a conversation and may allow determining the intend of the sentences. A dialogue act classifier may allow separating an interaction, e.g. a conversation or a transcript of a conversation, into constituents of an interaction, e.g. questions or contextual information. An Intent Classifier may be software that allows identifying sentences that convey the customer's desires or may indicate questions they have.

Contextual Information may be extracted by analysing one or more sentences, e.g. two sentences, five sentences, or a number of characters following an identified question, e.g. 100 characters, 200 characters, which have been identified after the provision of a question.

Output of a QA extractor 504 may be a list of tuples 506 for an interaction recording, wherein each tuple includes a question and context to the question.

Example A illustrates a processes occurring at a QA extractor. An example transcript of a customer agent interaction may read:

Agent: Thank you for calling XYZ Insurance. This is Mark. How can I assist you today?

Customer: Hi Mark. I have a few general questions . . .

Agent: Of course, I'm here to help. What . . .

Customer: Firstly, I recently moved to a new address. How do I update my policy with my new address.

Agent: That's an important step to ensure that all communication and documentation reaches you at the correct location. To update your policy with your new address, I'll need your policy number and the new address details. Could you please provide me with that information?

Customer: Sure, my policy number . . .

Agent: Thank you for providing the details. Updating your address is a simple process . . .

Customer: Yes, I have one more question. I recently got married and I would like to add my spouse to my policy. How can I do that?

Agent: Congratulations on your marriage! Adding your spouse to your policy is a common request. To proceed, I'll need some information about your spouse, such as their full name, date of birth, and driver's license number. Could you please provide me with those details?

Customer: Certainly. My Spouse's name is Emily Johnson . . .

Using a QA extractor, e.g. QA extractor 504, questions and context to the questions may be identified and a list of tuples may be created that include combinations of a question and contextual information to a question, e.g. combinations A and B:

Combination A:

Identified question in the transcript:

Firstly, I recently moved to a new address. How do I update my policy with my new address.

Identified context to the question in the transcript:

That's an important step to ensure that all communication and documentation reaches you at the correct location. To update your policy with your new address, I'll need your policy number and the new address details. Could you please provide me with that information?

Combination B:

Identified question in the transcript:

Customer: Yes, I have one more question. I recently got married and I would like to add my spouse to my policy. How can I do that?

Identified context to the question in the transcript:

Congratulations on your marriage! Adding your spouse to your policy is a common request. To proceed, I'll need some information about your spouse, such as their full name, date of birth, and driver's license number. Could you please provide me with those details?

A QA refiner, e.g. refiner 508, may receive a list of tuples 506 that have been generated, e.g. by a QA extractor 504 and each tuple may include a question and contextual information. A machine learning model, e.g. a large language model may be used to condense and generalize a question in the first element of a tuple. An LLM may also be used to identify an answer to the question present in the first element of the tuple within the context to the question in the second element of the tuple. In case that no answer to question can be identified an LLM may respond with "No answer".

A QA refiner 508 may generate a list of tuples 510, wherein each tuple may include a question-answer combination, e.g. a refined question and a potential answer.

For example, for each identified question and context tuple 506, an answer to a question of a tuple is identified within the context of a question, e.g. using an LLM model. In some embodiments, a question may be refined.

For example, a question-context combination prior to refiner processing may read:

Firstly, I recently moved to a new address. How do I update my policy with my new address?

That's an important step to ensure that all communication and documentation reaches you out at the correct location. To update your policy with your new address, I'll need your policy number and the new address details. Could you please provide me with that information?

For example, a question-answer combination after refining may read:

How can I update my policy with my new address?

To update your policy with your new address, you need to provide your policy and the new address details to your insurance agent.

In case that a question includes an answer for a question, a question-answer combination may be stored in a database and one or more question answer combinations may form part of an frequently asked questions page, e.g. question-answer combinations A, B and C of a generated FAQ page may include:

Question-answer combination A:

What steps should I take to change my address in my policy?

To make changes to your policy address, you should get in touch with your insurance agent and provide them with your policy number along with the update address information.

Question-answer combination B:

What types of insurance policies are offered by your company?

We offer a wide range of insurance policies, including but not limited to auto insurance, home insurance, life insurance, health insurance, and business insurance. We strive to meet the diverse needs of our customers.

Question-answer combination C:

What factors affect my insurance premium?

Several factors influence your insurance premium, including your age, driving record (for auto insurance), location, coverage limits, deductible amount, and the type of policy you choose.

Figure 6:
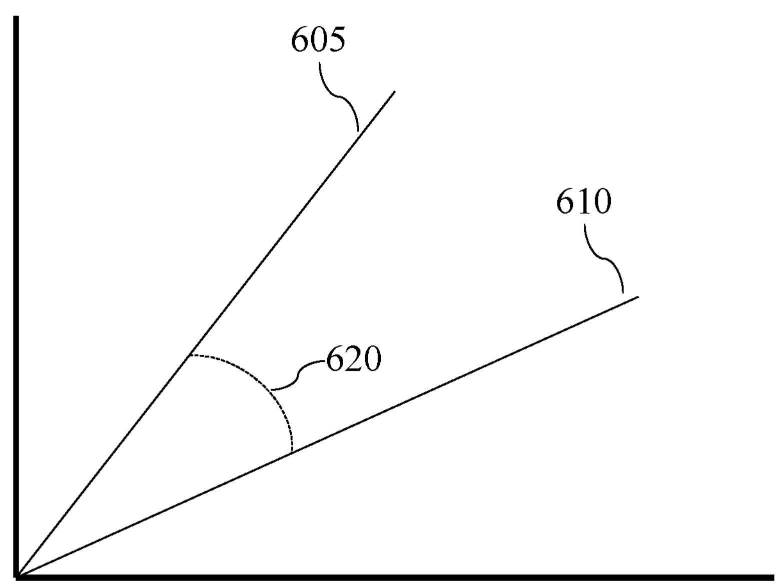
FIG. 6 illustrates the assessment of semantic similarity between a question and a recorded question using a vectorial representation of the questions, according to some embodiments of the present invention.

A QA grouping module 512 may receive question-answer combinations, e.g. in form of a list of tuples 510. Each tuple may include a refined question and a potential answer. A QA grouping module, e.g. module 510, may be a service that semantically groups a combination of refined question and potential answer to a question that show a semantical relationship. For example, a semantical relationship between questions may be identified using, for example, embedding and cosine similarity metric as shown in FIG. 6. A grouping, e.g. via a QA grouping module 512, may generate groups of similar questions and their potential answers.

Question answer tuples may be grouped, for example, by associating answers with a question with the highest semantic similarity score (e.g., cosine similarity as illustrated in FIG. 6).

In the case that a low semantic similarity score is associated with answers for all question groups, a new question may be added to a database, e.g. a new question answer group may be created for a tuple.

A common technique to identify whether or not two vectors are similar to each other may be using cosine similarity. This may be achieved by vectorizing questions and/or answers into vectors and calculating an angle between the embeddings of the vectors in the embedding space. FIG. 6 illustrates the assessment of semantic similarity between a question and a recorded question using a vectorial representation of the questions. Question 605 may read "How can I update my policy with my new address?". Question 610 may read "What steps should I take to change my address on my policy?". Both questions may be expressed as vectors, e.g. using embeddings that can be compared with a cosine-similarity library such as a "sentence-bert" library. A cosine value may be calculated based on the orientation of vectorial representations for questions 605 and 610. For questions that show a high semantic similarity, e.g. questions that have similar or identical content such as questions 605 and 610, a cosine value for a vectorial representation of two questions or two answers may be close to the value "1". For example, questions may be considered semantically similar if or when a cosine value is above a certain threshold, e.g. when a cosine value is close to the value "1", such as "0.95", "0.97", "0.99", or may have the value "1".

Figure 7:
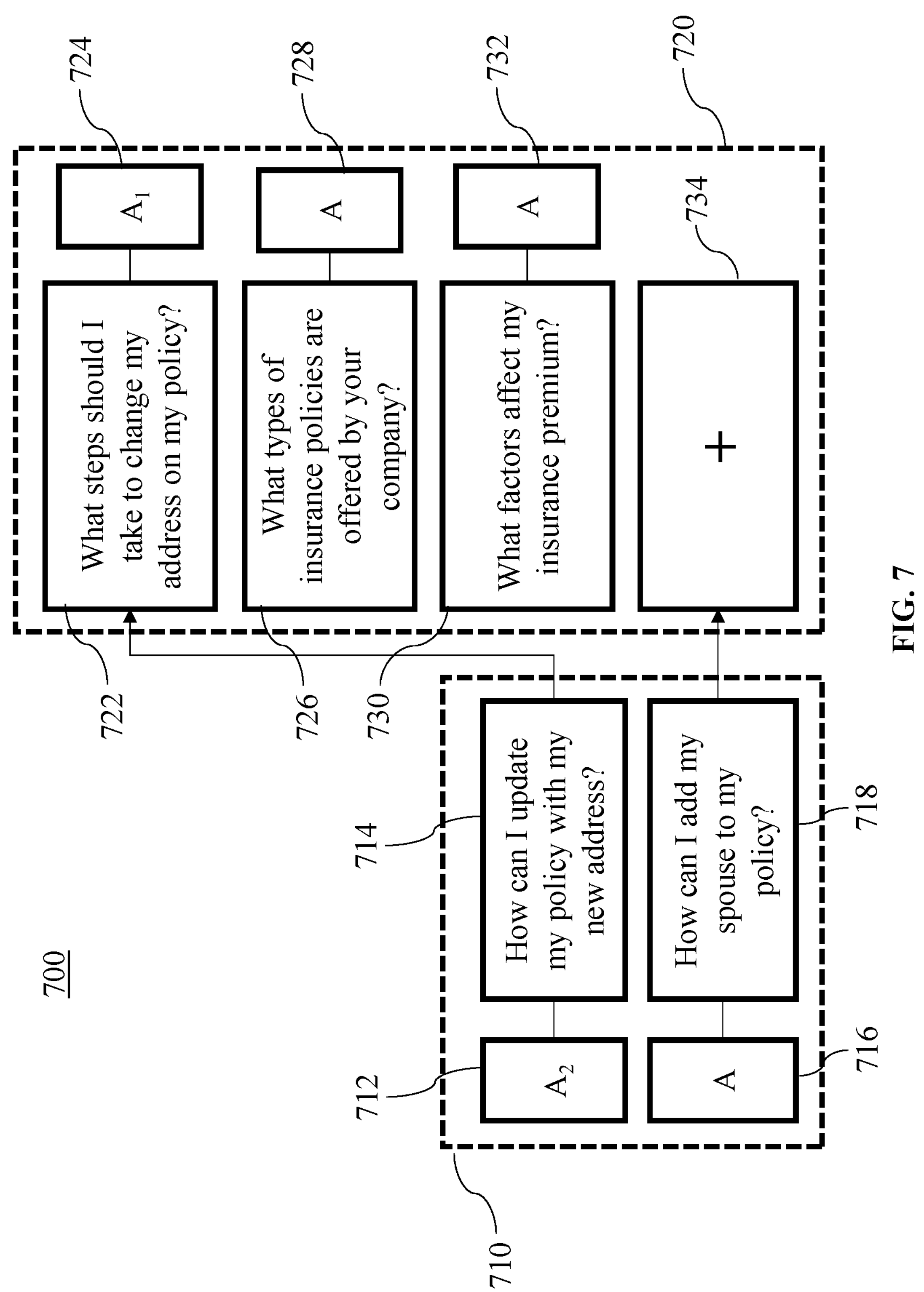
FIG. 7 illustrates an example for querying a database for a recorded question-answer combination, according to some embodiments of the present invention.

FIG. 7 illustrates an example 700 for querying a database for recorded questions and/or answers of recorded question-answer combinations and storing questions and/or answers in the database.

For example, a first question-answer combination including question 714 and answer 712 and a second question-answer combination including question 718 and answer 716 may be identified in an interaction recording, e.g. transcript 710, for example, after processing by QA extractor 408 and QA refiner 410. Prior to the storing of questions 714 and 718 with answers $A_2$ and A in a database, e.g. database 720, questions 714 and 718 may be assessed in their similarity to recorded questions using module 420. For example, they may be assessed in their semantic similarity to recorded questions 722, 726, 730 and answers 724, 728, 732 via vectorization of the questions and/or answers as described in FIG. 6.

Question 714 may be identified as semantically similar to question 722 and a counter value of question 722 may be increased by a value, e.g. "1". A value or counter value may be initialized, e.g. at a value of "0". Assessment of the similarity $A_2$ to recorded answer $A_1$ (724) of question 722 may reveal that answer $A_2$ is not similar or identical to recorded answer $A_1$. Accordingly, answer $A_2$ may be added as a potential answer to question 722. Question 718 may be identified not to be semantically similar to any of the recorded questions in a database, e.g. questions 722, 726 and 730. Thus, question 718 and corresponding answer A (716) may be a new question-answer combination 734 that can be introduced into a database, e.g. database 720.

Figure 8:
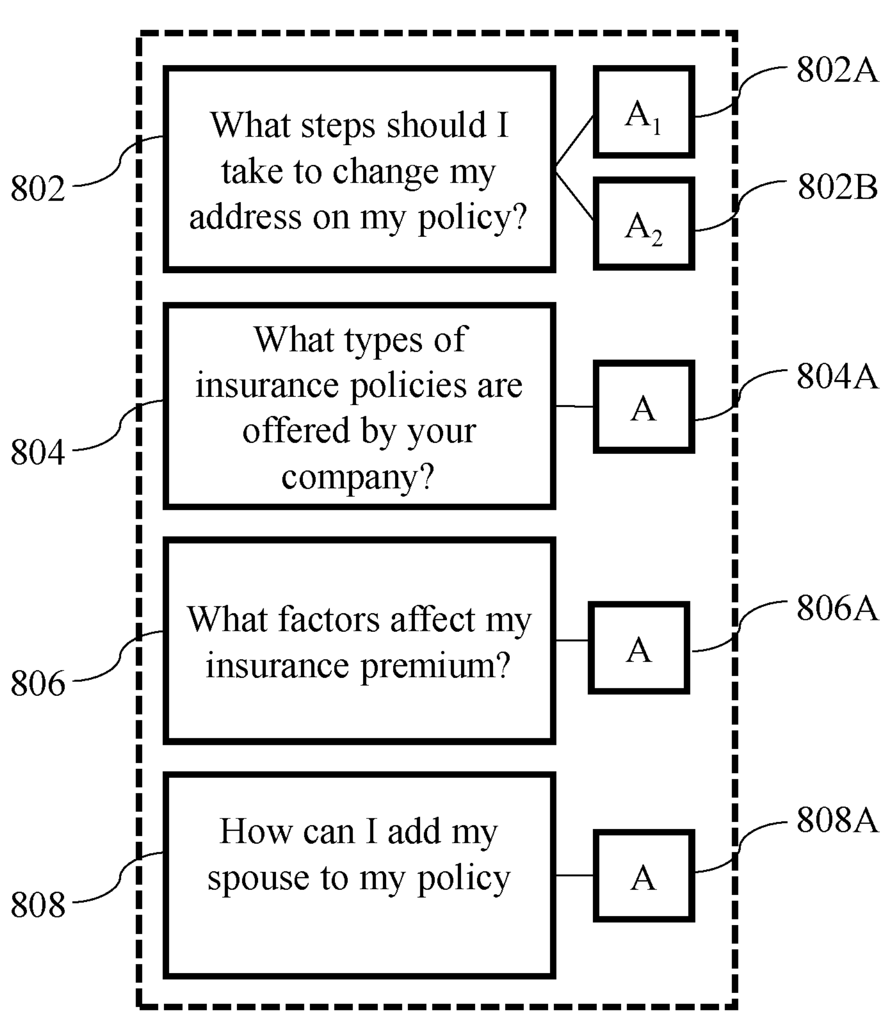
FIG. 8 depicts an example of an updated database, after integration of question-answer combinations into a database, according to some embodiments of the present invention.

FIG. 8 depicts an example 800 of an updated database 720, after storing of one or more questions and/or answers.

Answer $A_2$ may be added as a potential answer 802B for question 802 in addition to previously recorded answer $A_1$ (802A). Question 804 and answer 804A and question 806 and answer 806A may remain unchanged. A new question-answer combination including question 808 and answer 808A may be added, for example as shown in database 800.

Referring back to FIG. 5, for questions and question-answer combinations generated in QA grouping 512, insights provider 420 may identify whether or not a question and/or an answer may be present in interactions recordings, e.g. in agent-customer interaction transcripts. In case that a question or question-answer combination is identified in an interaction, values of counters for a question or question-answer combination may be increased to reflect their presence and identify questions or question-answer combinations that show an increased appearance in interaction recordings.

For example, insights provider 420 may track counters that reflect an appearance of questions and/or question-answer combinations in interaction recordings and can generate a list of frequently asked questions or frequently occurring question-answer combinations in interactions that lie above a pre-set threshold, e.g. a question-answer combination may be considered as frequently occurring if it is present in 30% of analyzed interactions, and provides an indication to the relevance of the question to customers.

Software, e.g. insights provider 420, may automatically generate or update a list of frequently asked questions (FAQ) and answers for the FAQs by periodically identifying question-answer combinations which have a counter value that is above a threshold counter value. Software, such as insights provider 420, may initialize a value or counter value, e.g. at a value of "0".

For example, lists of FAQs for IT related agent customer interactions in contact centers may allow generating new answers to existing questions, e.g. to illustrate alternative, innovative paths to problem solving in IT. New questions focused on specific areas of a product can help resolving bugs and other issues. For example, customer issues may be resolved faster than individual agent escalation of customer issues. Insights provider software 420 may generate new lists of FAQs that may contain specific IT keywords and may present a user, e.g. a customer of a contact center with a list of FAQs that can be grouped by keyword, when a counter for a question and/or answer lies above a configurable threshold, e.g. 30%.

For example, in QM, new lists of FAQs can help supervisors to estimate agent performance when faced with new material, that was not part of an existing knowledgebase. Insights provider 420 may highlight new questions and answers, and, through integration with software models for resolution of customer queries, frequently asked questions and answers may be used in the creation of a quiz on customer issues, e.g. to generate a training of contact center agents.

Figure 9A:
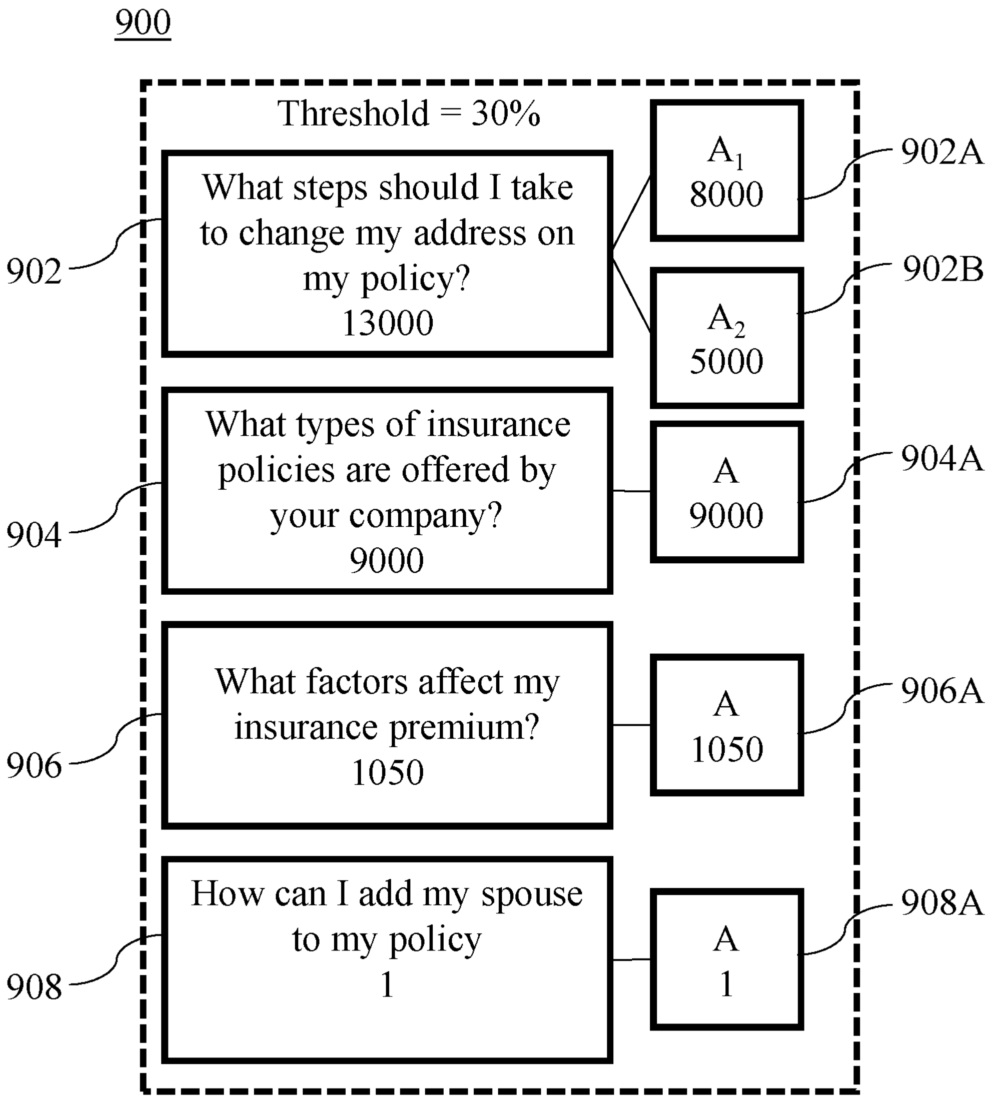
FIG. 9A illustrates an example for the assignment of counter values in the identification of question-answer combinations based on comparison with threshold counter values, according to some embodiments of the present invention.

FIG. 9A shows an example database 900, which can be used in the generation of a list of FAQs based on assigned counter values for questions and/or answers. Database 900 may include questions 902, 904, 906 and 908 and answers 902A, 902B, 904A, 906A and 908A. Each question and each answer may have a counter value. Counter values may indicate how many times a question and/or an answer to a question may have been identified in interaction recordings for a given period of time, e.g. within the last month. For example, question 902 may have a counter value of 13,000 for the question "What steps should I take to change my address on my policy?" and answer 902A to question 902 may have a counter value of 8,000 and answer 902B may have a counter value of 5,000. Software, e.g. an insight provider 420, can be used to generate a list of FAQs for questions and answer present in database 900 based on counter values by setting a threshold for counter values for which a question and/or an answer may be included in a list of FAQs. For example, a threshold may be a relative value, such as a ratio of a counter value for a question in relation to all counter values of all questions such as 30%.

Figure 9B:
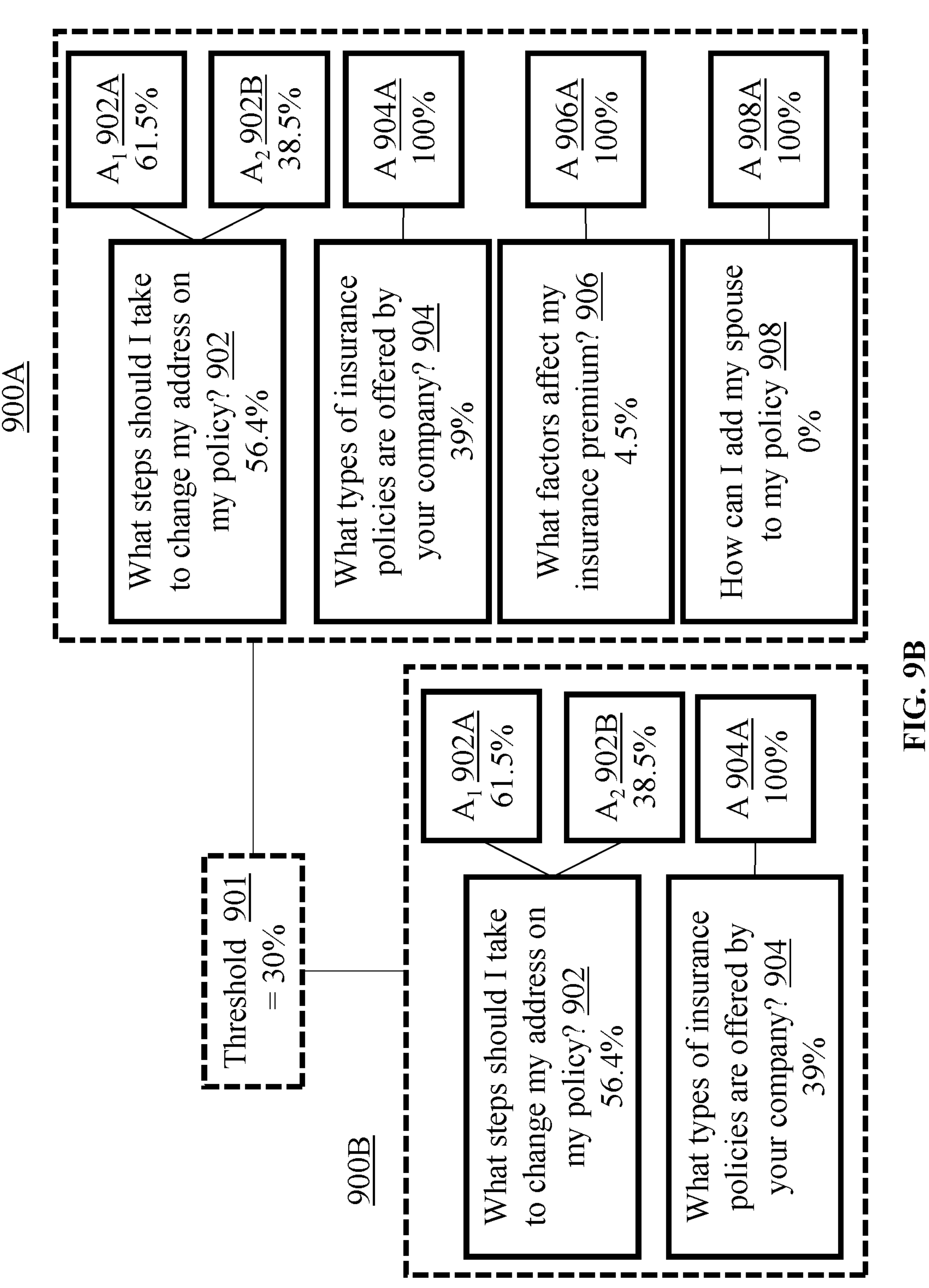
FIG. 9B illustrates an example of the identification of question-answer combinations based on comparison with threshold counter values, according to some embodiments of the present invention.

FIG. 9B illustrates an example of the identification of question-answer combinations based on comparison of counter values of questions and/or answer and threshold counter values, e.g. to generate a list of FAQs.

Based on the counter values for questions 902, 904, 906 and 908 and answers 902A, 902B, 904, 906 and 908, relative counter values may be calculated. For example, relative counter values for recorded questions may be generated by calculating a ratio of a counter value for a question in relation to all recorded counter values for all recorded questions. For example, a relative counter value for question 902 may be calculated as follows: 13000/(13000+9000+1050+1)·100%=56.4%. For example, relative counter values for recorded answers may be calculated by calculating a ratio of a counter value for an answer to a question in relation to all recorded counter values for all recorded answers for the question. For example, a relative counter value for answer 902A may be calculated as follows: 8000/(8000+13000)·100%=61.5%. In case that a question only has one answer, a relative counter value for the answer may be 100%. Calculated relative counter values may be extracted from a database, e.g. database 900A, for a set threshold 901 of counter values. For example, for a threshold 901 of 30%, a list of FAQs 900B may be generated that includes questions and answers to the questions of database 900A that have a relative counter value of at least 30%. Accordingly, question 902 and answers 902A and 902B and question 904 and answer 904A may be included in a list of frequently asked questions 900B.

FIG. 10A depicts an example of a user interface for a frequency analysis of questions. A user interface, e.g. an FAQ Admin Dashboard of insights provider 420, may be used, e.g. by an agent of a contact center, to view existing questions of a database that are displayed on an FAQ page and their appearances in interactions with customers. For example, for each question, a percentage value may indicate a ratio of a number of times a question appeared in all interactions with a customer. An agent may also view questions of question-answer combinations that have been recorded in a database, e.g. in an FAQ universe, but may not form part of an FAQ list. An agent or a supervisor of an agent, e.g. a FAQ administrator who is responsible for maintaining a list of frequently asked questions, may add new question-answer combinations to a FAQ list based on recommendations provided by software, e.g. insights provider 420.

FIG. 10B depicts an example of a user interface for a frequency analysis of questions of newly recorded question-answer combinations. In this interface, new questions may be listed in relation to their absolute counter, e.g. the number of times a question was identified in interactions, e.g. interactions between agents and customers.

FIG. 11 depicts an example of a user interface for a frequency analysis of questions-answer combinations. An FAQ administrator can update an answer to an existing question in the FAQ based on the Insights Provider-provided answers. An FAQ administrator can update the wording of an existing question in the FAQ page. An FAQ administrator can add a new question and answer based on the Insights Provider recommendations.

Figure 12:
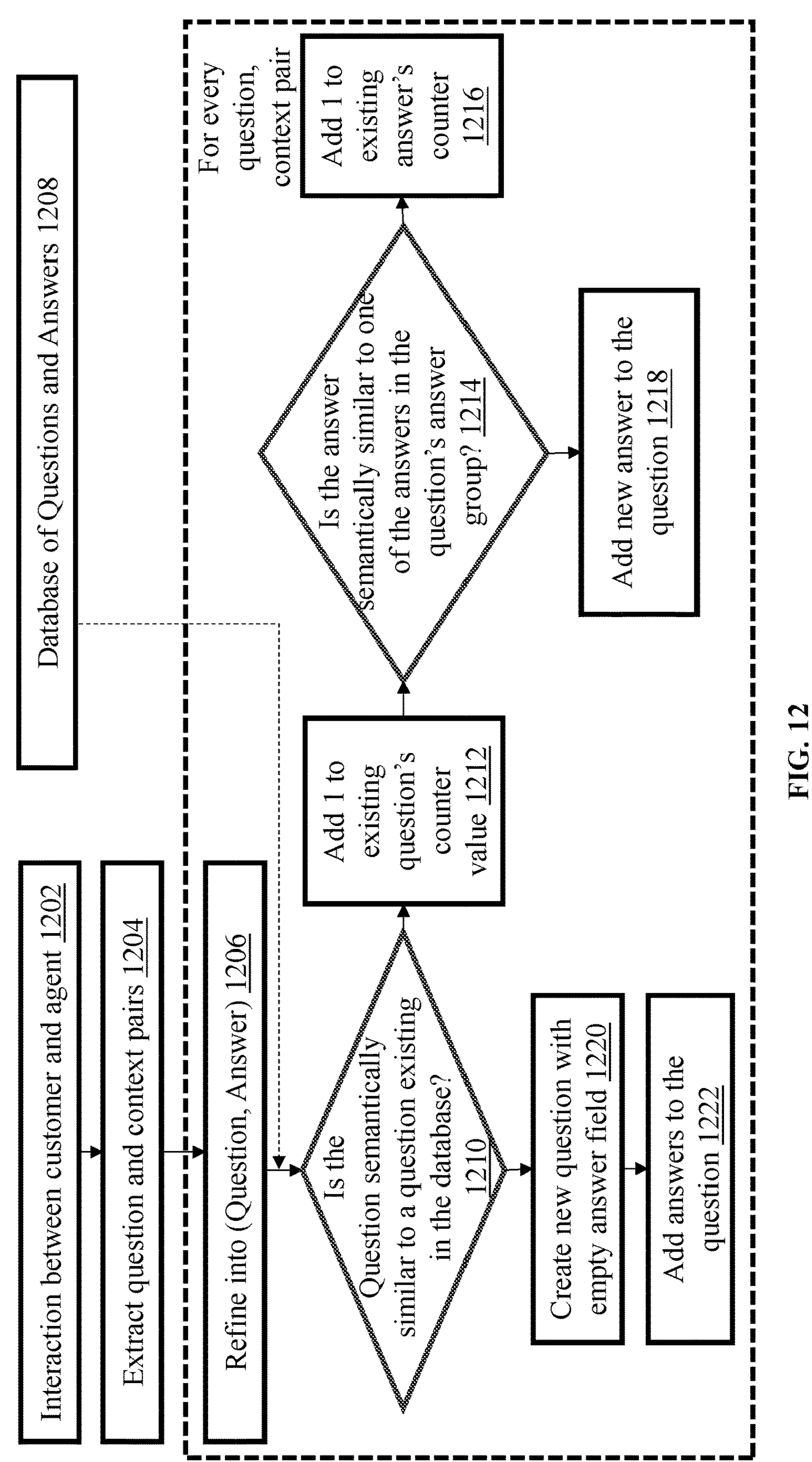
FIG. 12 depicts an allocation diagram in the generation of question-answer combinations, according to some embodiments of the present invention.

FIG. 12 depicts an allocation diagram in the generation of question-answer combinations. Interaction recordings, e.g. from an interaction between a customer and agent 1202, may be used to identify question context combination, e.g. question context pairs 1204 using an extractor service, e.g. QA extractor service. Each of the identified question context pairs 1204 may undergo refinement 1206, e.g. using QA refiner 410, to identify answers to questions within the context for each question. Questions and/or answers of question-answer combinations may be compared to recorded question-answer combinations that are stored in a database, e.g. a database 1208, for example by assessing the semantical similarity 1210 of a question and one or more questions which are recorded in a database, e.g. database 418. Software, such as insights provider 420, may initialize a value or counter value for questions and/or answers, e.g. at a value of "O". In case that a question is similar or identical to a question recorded in a database, a counter value for the recorded question may be increased, e.g. by adding a value of "1" to the counter value of the recorded question (1212). In case that a recorded question is similar or identical to a question of an interaction transcript, it may be identified whether or not the answer to the question is semantically similar to a recorded answer for the recorded question (1214). In case that an answer is identified as semantically similar or identical to a recorded answer of the recorded question, a counter value for the recorded answer may be increased, e.g. by adding a value of "1" to the counter value for a recorded answer (1216). In case that an answer is not identified as semantically similar or identical to a recorded answer of the recorded question, the answer may be added to the recorded question as a new answer (1218) and may be stored in a database, e.g. database 418.

In case that a question is not semantically similar or identical to a recorded question (1220), the question and the identified answer may be added to a database, e.g. database 418. In case that a question that is not semantically similar or identical to a recorded question, a question may be stored in a database without an answer, e.g. with an empty answer field to a question. An answer to a question may be added as soon as an answer is available (1222), e.g. using insights module 420.

Figure 13:
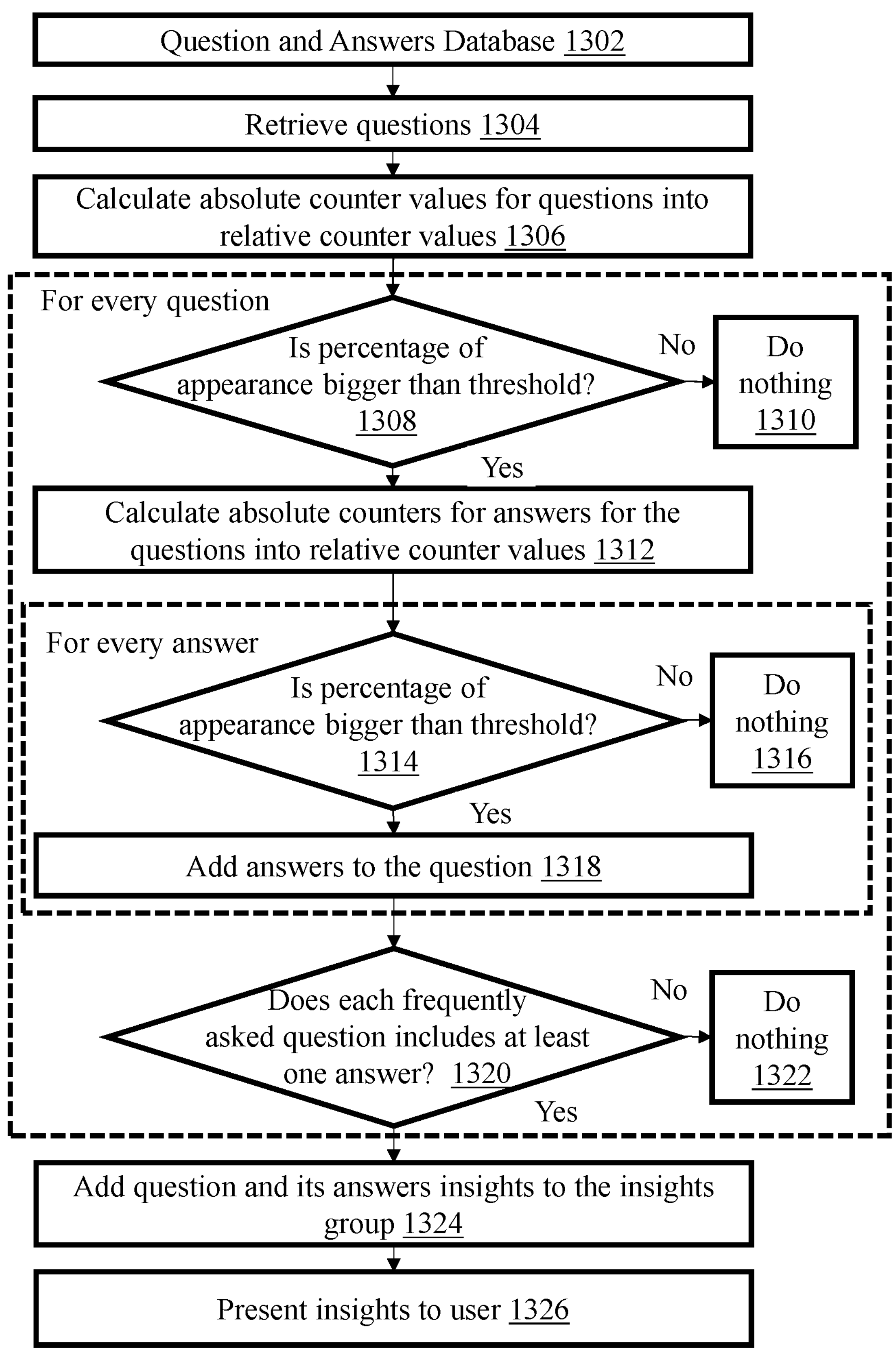
FIG. 13 depicts an allocation diagram illustrating the generation of lists of frequently asked questions and answers, according to some embodiments of the present invention.

FIG. 13 depicts an allocation diagram illustrating the generation of lists of frequently asked questions and answers. Questions 1304 may be retrieved from a question and answer database 1302, e.g. database 418. Questions 1304 may include counter values, e.g. absolute counter values that indicate how many times in a specific time period, e.g. last month, a question was identified in an interaction transcript. Software, such as insights provider 420, may initialize a value or counter value, e.g. at a value of "0". For example, absolute counter values may be used in the calculation of relative counter values 1306 as outlined in FIG. 10B. Relative counter values for each question may be compared to a threshold value 1308. In case that a counter value for a question is lower than a threshold value, a question may be ignored in the generation of a list of frequently asked questions and answers (1310). In case that a counter relative value for a question is equal to or greater than a threshold value, the question may be determined to be a frequently asked question and absolute counter values for answers to the frequently asked questions may be used in the calculation of relative counter values for answers for each frequently asked question 1312. Relative counter values for each answer may be compared to a threshold value 1314. In case that a counter value for an answer is lower than a threshold value, an answer may be ignored in the generation of a list of frequently asked questions and answers (1316). In case that a relative counter value for an answer is equal to or greater than a threshold value, the answer may be determined to be a frequently asked question for a frequently asked answer and may be included in a list of frequently asked questions and answers (1318). In step 1320, it may be checked, e.g. by insights module 420, whether or not each frequently asked question includes at least one answer 1320. In case that no answer is linked to a frequently asked question, the question cannot be included in a list of frequently asked questions and answers (1322). In case that a frequently asked question includes a frequently provided answer question, a frequently provided question and answer may be included in a list of frequently asked questions and answers 1324. A generated list of frequently asked questions and answers may be provided to a user 1326, e.g. a customer or an agent of a contact center.

The aforementioned flowcharts and diagrams illustrate the architecture, functionality, and operation of possible implementations of systems, methods and computer program products according to various embodiments of the present invention. In this regard, each portion in the flowchart or portion diagrams may represent a module, segment, or portion of code, which includes one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved, It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system".

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

What is claimed is:

1. A method of language processing comprising:

identifying a question and context for the question in an interaction recording;

identifying whether the context for the question comprises an answer to the question using a machine learning model, and:

when the context for the question includes the answer to the question, generating a question-answer combination and querying a database for the generated question-answer combination and storing the generated question-answer combination in the database when the generated question-answer combination is not recorded in the database; and when the context does not include the answer to the question, querying the database for the identified question and storing the question in the database, when the identified question is not recorded in the database.

2. The method according to claim 1, wherein the method comprises separating the question-answer combination from the interaction recording using the machine learning model.

3. The method according to claim 1, wherein the machine learning model is a large language model.

4. The method according to claim 1, wherein querying the database for the generated question-answer combination further comprises:

when the generated question-answer combination is recorded in the database, increasing a counter for the generated question-answer combination; and when only the question of the generated question-answer combination is recorded in the database, adding the answer of the generated question-answer combination to the recorded question.

5. The method according to claim 4, wherein the method comprises periodically identifying question-answer combinations which have a counter value that is above a threshold counter value and generating a list of frequently asked questions and answers corresponding to the question-answer combinations that are periodically identified.

6. The method according to claim 5, comprising using the list of frequently asked questions and answers in automatic provision of an answer to a received question.

7. The method according to claim 5, comprising using the list of frequently asked questions and answers in providing an agent with recommended answers to a customer query.

8. The method according to claim 4, wherein a similarity between the question of the generated question-answer combination and the question in the question-answer combination recorded in the database is identified by assessing a semantic similarity between the questions.

9. The method according to claim 8, wherein the semantic similarity between the questions is assessed by vectorial representation of the questions and calculation of a cosine similarity.

10. The method according to claim 1, comprising automatically updating recorded question-answer combinations by updating one or more of: a question, an answer to a question, a question-answer combination.

11. A system for language processing, the system comprising:

a computing device;

a memory; and a processor, the processor configured to:

identify a question and context for the question in an interaction recording;

identify whether the context for the question comprises an answer to the question using a machine learning model, and:

when the context for the question includes the answer to the question, generate a question-answer combination and query a database for the generated question-answer combination and store the generated question-answer combination in the database when the generated question-answer combination is not recorded in the database; and when the context does not include the answer to the question, query the database for the identified question and store the question in the database, when the identified question is not recorded in the database.

12. The system according to claim 11, wherein the processor is configured to separate the question-answer combination from the interaction recording using the machine learning model.

13. The system according to claim 11, wherein the machine learning model is a large language model.

14. The system according to claim 11, wherein the processor is configured to:

when the generated question-answer combination is recorded in the database, increase a counter for the generated question-answer combination; and when only the question of the generated question-answer combination is recorded in the database, add the answer of the generated question-answer combination to the recorded question.

15. The system according to claim 14, wherein the processor is configured to periodically identify question-answer combinations which have a counter value that is above a threshold counter value and generate a list of frequently asked questions and answers corresponding to the question-answer combinations that are periodically identified.

16. The system according to claim 15, wherein the processor is configured to use the list of frequently asked questions and answers in automatic provision of an answer to a received question.

17. The system according to claim 15, wherein the processor is configured to use the list of frequently asked questions and answers in providing an agent with recommended answers to a customer query.

18. The system according to claim 14, wherein a similarity between the question of the generated question-answer combination and the question in the question-answer combination recorded in the database is identified by assessing a semantic similarity between the questions.

19. The system according to claim 18, wherein the semantic similarity between the questions is assessed by vectorial representation of the questions and calculation of a cosine similarity.

20. A method of language processing of interaction recordings, the method comprising:

identifying a question and context for the question in a recording of an interaction;

identifying whether the context for the question comprises a response to the question using a machine learning model, and:

when the context for the question includes the response to the question, creating a question-response pair and querying a database for the created question-response pair and storing the created question-response pair in the database when the created question-response pair is not recorded in the database; and when the context does not include the response to the question, querying the database for the identified question and storing the question in the database, when the identified question is not recorded in the database.

* * * * *